United States Patent [19]

Sugiyama

[11] Patent Number: 4,913,386
[45] Date of Patent: Apr. 3, 1990

[54] FIXING APPARATUS FOR FIXING TUBULAR MEMBERS ALLOWING FLUID TO PASS THERETHROUGH

[75] Inventor: Kenji Sugiyama, Numazu, Japan

[73] Assignee: Usui Kokusai Sangyo Kaisha Ltd., Shizuoka, Japan

[21] Appl. No.: 281,172

[22] Filed: Dec. 7, 1988

[30] Foreign Application Priority Data

Dec. 12, 1987 [JP] Japan .......................... 62-189263[U]
Feb. 17, 1988 [JP] Japan ............................ 63-19768[U]
Feb. 20, 1988 [JP] Japan ............................ 63-21415[U]

[51] Int. Cl.⁴ .............................................. F16L 3/22
[52] U.S. Cl. ................................. 248/68.1; 248/74.2; 403/389
[58] Field of Search .............. 248/65, 68.1, 69, 74.2; 403/389, 391, 396

[56] References Cited

U.S. PATENT DOCUMENTS 2,916,746 12/1959 Pease ............................ 403/389 X
3,486,531 12/1969 Nalodka ...................... 248/74.2 X
4,707,906 11/1987 Posey ......................... 248/74.2 X

FOREIGN PATENT DOCUMENTS 3226185 1/1984 Fed. Rep. of Germany ........ 248/69
1099326 9/1933 France ............................. 248/68.1
2142376 1/1985 United Kingdom ............... 248/74.2

Primary Examiner—David L. Talbott
Attorney, Agent, or Firm—Anthony J. Casella; Gerald E. Hespos

[57] ABSTRACT

A tubular member fixing apparatus having U-shaped clamping member for clamping a tubular member. The U-shaped clamping member has a clamping section at a bottom U portion functioning as confronting clamp walls. The clamp walls have confronting surfaces formed with recessed groove or notched groove. The tubular member is provided with a locking projection engageable with the recessed groove or the notched groove. The locking projection is defined by a radially outwardly buldged portion of the tubular member or a separate annular ring body fixedly attached to the outer peripheral surface of the tubular member. When the tubular member is inserted into the U-shaped clamp walls, the locking projection is brought into engagement with the recessed groove or the notched groove, to thereby ensure fixing of the tubular member to the clamping member.

2 Claims, 4 Drawing Sheets

FIXING APPARATUS FOR FIXING TUBULAR MEMBERS ALLOWING FLUID TO PASS THERETHROUGH

BACKGROUND OF THE INVENTION

1. Field of the Invention

The present invention relates to a fixing apparatus for fixing tubular members which permit fluid such as oil and gas to pass therethrough for use in an automobile or various equipments and devices. More particularly, the invention relates to an improvement on the fixing apparatus for fixing tubular members to a base body or on a clamping means in the fixing apparatus for clamping a plurality of tubular members at a given position, the tubular member being formed of metal or resin having a relatively small diameter such as about not more than 20 mm.

2. Description of the Prior Art

According to a conventional fixing apparatus of this kind, clamp members having various configurations have been used. For example, in case of clamping a metallic tubular member, the tubular member is fixedly secured to the clamp member by means of brazing. With the structure, however, assembling or fixing work may be troublesome since it requires thermal brazing, to thereby degrade productivity. Further, a local heating may occur, to thereby generate cracks at the fixing portion or damage to that portion. As a result, sufficient mechanical strength may not be obtainable by mere brazing.

Another conventional fixing apparatus is shown in FIG. 10, in which an elongated plate formed of a metal is prepared, and one longitudinal end portion of the plate is arcuately bent to provide a clamping wall 12. The elongated plate has another end provided with a clamping body 11 at which a through hole 13 is formed. A tubular member P1 is assembled into the clamping wall 12 whereas the clamping body 11 is fixedly secured to a base body (not shown). The clamping wall 12 has an inner diameter substantially equal to an outer diameter of the tubular member P1, and the clamping wall 12 is subjected to pressure deformation over the tubular member P1, to thereby fix the latter to the clamping wall 12.

In another fixing apparatus, sufficient fixing of the tubular member P1 to the clamping wall 12 may not be attainable, since the arcuate clamping wall member 12 is merely pressed along the outer peripheral surface of the tubular member P1. Accordingly, the tubular member P1 may be deviated from its original fixing position due to vibration attended to operation of the associated device such as an engine ignition. Further, due to the insufficient clamping, outer peripheral surface of the tubular member P1 may be frictionally worn. If clamping force is further applied to the clamping wall 12, the tubular member P1 is excessively deformed, to thereby increase flow resistance within the tubular member P1.

SUMMARY OF THE INVENTION

It is an object of the present invention to overcome the above-described drawbacks and deficiencies, and to provide an improved fixing apparatus for fixing at least one tubular member.

Another object of the invention is to provide such apparatus which can eliminate brazing work, to thereby avoid lowering of mechanical strength at the fixing portion.

Still another object of the invention is to provide the apparatus capable of minimizing displacement of a tubular member even against the application of vibration thereto, and simultaneously obviating external scratch at the outer peripheral surface of the tubular member.

Still another object of the invention is to provide such apparatus having a clamp member which requires only a small amount of force for clamping, so that deformation of the tubular member is avoidable, to thereby maintain smoth* flowing of fluid within the tubular member.

According to the present invention, there is provided a tubular member fixing apparatus by means of a clamping member having U-shape and formed of an elongated plate. The clamping member is provided with clamp walls whose confronting inner surfaces are formed with a recessed groove extending in longitudinal direction of the clamping member or notched groove is formed at the clamp walls. On the other hand, the tubular member has an annular buldged portion extending radially outwardly, or is provided with an annular member. The annular buldge portion or the annular member is engageable with the recessed groove or notched groove, so that the tubular member is clampingly fixed by the clamping member. Further, as attachment wall extends from one end of the clamp wall. The attachment wall is formed with protrusion walls inwardly projecting therefrom so as to spacedly fix a plurality of tubular members to the attachment wall.

Furthermore, the annular ring is formed of thermally shrinkable resin having adhesivity or non-reversible shape memory alloy.

According to the present invention described above after formation of the buldged portion by pressure deformation to the tubular member, or after the annular member is fixedly secured to a predetermined position at an outer peripheral surface of the tubular member, the buldged portion or the annular member is brought into engagement with the recessed groove or the notched groove, and thereafter, the U-shaped clamping member is subjected to further bending by pressing the clamp wall. As a result, the tubular member is securely fixed to the clamping member.

DETAILED DESCRIPTION OF THE PREFERRED EMBODIMENTS

Figure 1:
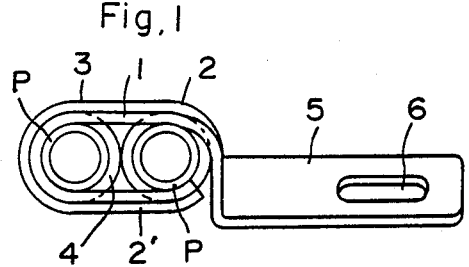
FIG. 1 is a front view showing a clamp member for fixing a tubular member according to one embodiment of this invention.
Figure 2:
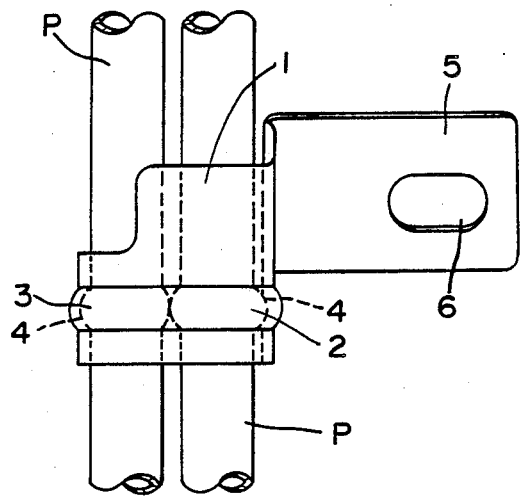
FIG. 2 is a plan view of the clamp member shown in FIG. 1.
Figure 3:
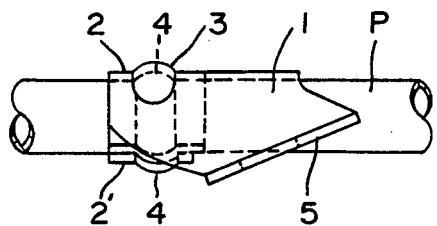
FIG. 3 is one side view of the clamp member.

A first embodiment according to this invention is shown in FIGS. 1 thru 5. A clamping member 1 has a U-shape cross-section which is provided by pressurizingly deforming an elongated metallic member. The clamping member 1 has a pair of clamp walls 2, 2' confronting with each other. Confronting surfaces of the clamp walls are formed with recessed groove 3 extending in longitudinal direction of the clamping member 1.

Tubular members P are adapted to be inserted into the clamping member 1. Each of the tubular members P has a part formed with an annular buldged portion 4 which is engageable with the recessed groove 3. Accordingly, the tubular members P are juxtaposed with each other and clampingly fixed to the clamping member 1.

The clamping member 1 is further provided with an attachment wall 5. The attachment wall 5 is an extension from one end of the clamp wall. A through hole 6 is formed at the attachment wall, so that the clamping member 1 is fixedly secured to an opponent base body by means of a bolt. Another end of the clamp wall is slightly bent so as to ensure securing of the tubular member P to the clamp member 1.

Figure 4:
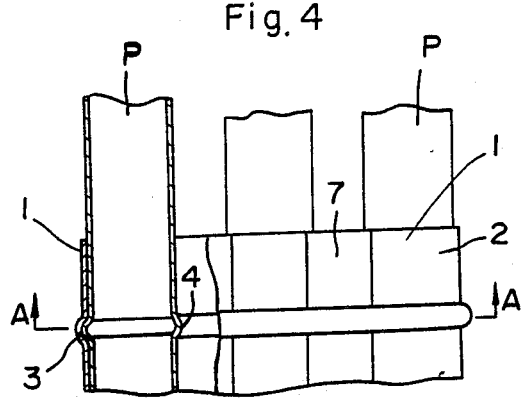
FIG. 4 is another side view of the clamp member.
Figure 5:
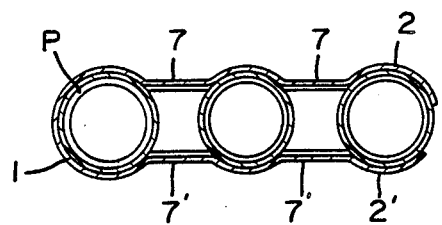
FIG. 5 is a cross-sectional view taken along the line AA in FIG. 4.

Further, as shown in FIGS. 4 and 5, an inwardly protruding walls 7, 7' are provided at the clamping member, each of the walls being protruded into a space defined between neighbouring tubular members P, so that the protruding walls 7 and 7' are spaced away from each other. If desired, the above-described attachment wall is eliminated, and instead, both ends of the clamp walls 2 2' are slightly bent inwardly so as to clampingly interpose a plurality of tubular members P between the clamp walls 2 and 2'.

Figure 6B:
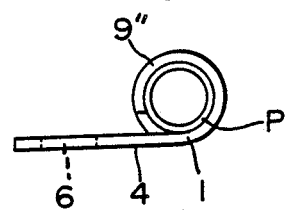
FIG. 6B is a front view of the clamp member shown in FIG. 6.
Figure 6A:
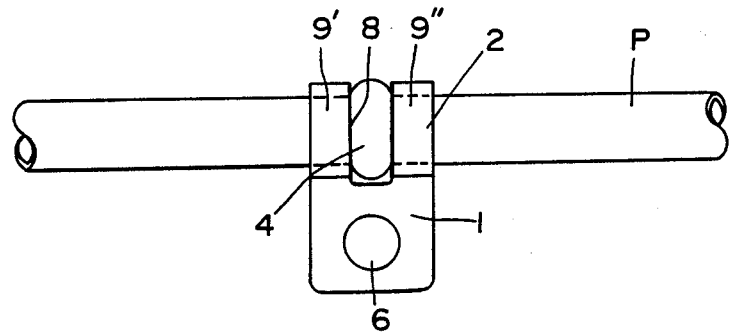
FIG. 6A is a plan view showing another embodiment according to this invention.
Figure 7A:
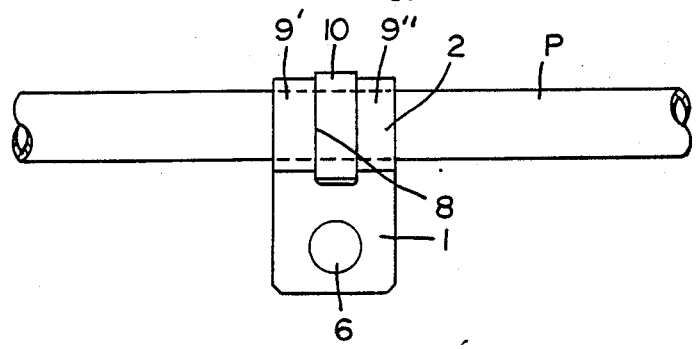
FIG. 7A is a plan view showing still another embodiment according to this invention.
Figure 7B:
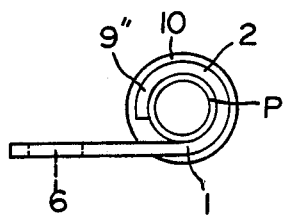
FIG. 7B is a front view of the still another embodiment shown in FIG. 7A.

Another embodiment according to this invention is shown in FIGS. 6 and 7. In the another embodiment, a notched groove 8 is formed at a center portion of the clamp walls 2, 2' in widthwise direction instead of the formation of the recessed groove 3 shown in the first embodiment. By forming the notched groove 8, provided is a locking wall 9' and 9" having bifurcated configuration.

In the embodiment shown in FIG. 6, the annular buldged portion 4 of the tubular member is fitted with the notched groove 8. On the other hand, according to the embodiment shown in FIG. 7, a separate annular member 10 is fixedly secured to the outer peripheral surface of the tubular member P, and the annular member 10 is fitted with the notched groove 8. The annular member 10 is formed of thermally contractable resin, or non-reversible shape memory alloy. If necessary, adhesive material is formed at an inner peripheral surface of the annular member 10 so as to adhere the same to the tubular member. Each of planar end faces of the annular member 10 is engageable with each one of the corresponding edge line of the notched groove. Incidentally, for fixing the annular member to the tubular member, after the annular member 10 is fitted with the tubular member at a predetermined position, the anular member 10 is subjected to heat treatment at a temperature more than a transformation point having relatively low temperature, so that the annular member is radially inwardly contracted thereby to ensure fixing between the tubular member and the annular member.

Figure 8:
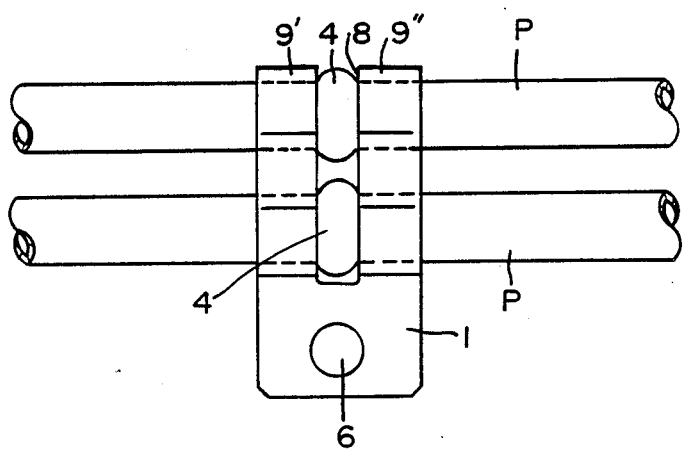
FIGS. 8 and 9 show still another embodiments in which modifications are effected to the embodiments shown in figs. 6A and 7A, respectively; and, FIG. 10 is a plan view showing a conventional fixing apparatus.
Figure 9:
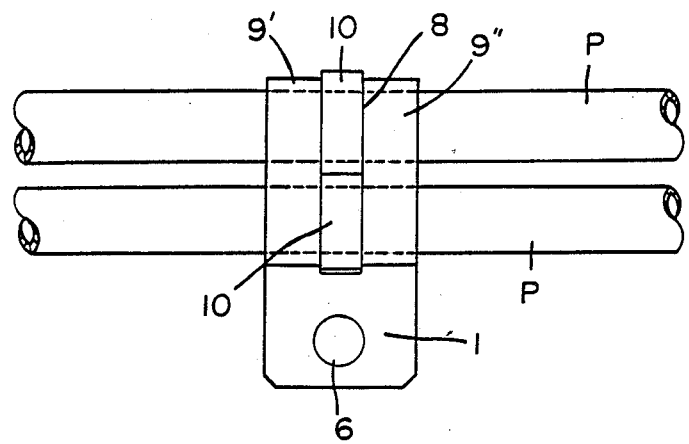
Figure 10:
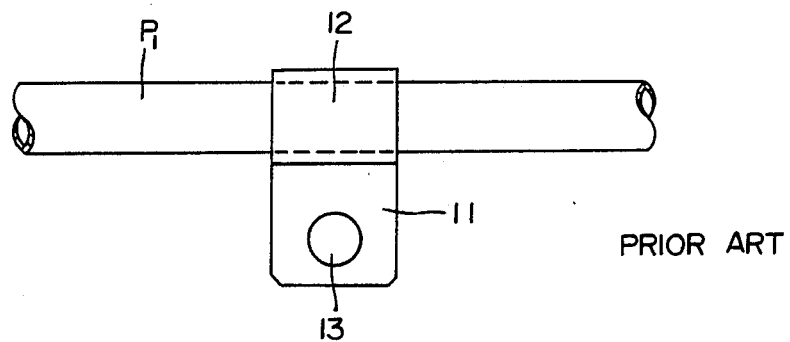

Further, as shown in FIGS. 8 and 9, plurality of tubular members P can be clamped by a single clamping member 1.

As described above, in the tubular fixing structure by means of the clamp member according to this invention, the recessed grooves 3 at the confronting clamping walls 2, 2' or the notched groove 8 is engageable with the radially outwardly buldged portion 4 of the tubular member or the annular member 10 disposed over the tubular member. Therefore, no brazing work is required and degradation of mechanical strength at the fixing portion due to heating is avoidable in case of the assembly of a metallic tubular member. Further, in case of the fixing of the tubular member formed of a resin, the tubular member may not be deformed at the fixing zone, and no positional displacement occurs due to vibration. As a result, smooth fluid flowing is obtainable. If necessary, a plurality of tubular members can be fixed spacedly with each other to the clamping member. Accordingly, if fluid having high temperature is flowed through one of the tubular members, another fluid passing through the remaining tubular members is protectable against the heat.

While the invention has been described in detail and with reference to specific embodiments thereof, it would be apparent for those skilled in the art that various changes and modifications can be made therein without departing from the spirit and scope of the invention.

What is claimed is:

1. A tubular member fixing apparatus for securing a plurality of tubes in fixed relationship to one another, said apparatus comprising:
   a plurality of tubular members each having an outer peripheral surface provided with an annular projection projecting radially outwardly therefrom, said tubular members being disposed generally parallel to one another with the annular projection of each said tubular member being in abutting relationship with the annular projection of another of said tubular member; and
   a generally U-shaped clamping member comprising a pair of opposed generally parallel clamp walls, an arcuate connecting wall extending unitarily between the clamp walls and a pair of arcuate end walls extending unitarily from the respective clamp walls toward one another, said clamp member comprising a continuous outwardly extending groove formed therein and extending along the clamp walls, the connecting wall and at least portions of the end walls, said groove conforming to the shape of the annular projections on the tubular members, portions of the groove formed on the clamp walls being in clamping engagement with portions of the annular projections on each side tubular members, portions of the groove on the connecting wall engaging portions of the annular projection on a first tubular members and portions of the groove on the end walls pressurizingly engaging portions of the annular projection on a second of the tubular member for fixedly clamping the annular projections of said tubular members in abutting relationship with one another and for preventing relative longitudinal movement of the tubular members relative to one another and relative to the clamping member.

2. The tubular member fixing apparatus as defined in claim 1, wherein one of said ends is provided with an attachment wall extending unitarily therefrom for attaching said apparatus to a base.

* * * * *